US010472079B2

(12) United States Patent
McBride et al.

(10) Patent No.: US 10,472,079 B2
(45) Date of Patent: Nov. 12, 2019

(54) ARTICULATED MOUNTS (71) Applicant: SIKORSKY AIRCRAFT CORPORATION, Stratford, CT (US)

(72) Inventors: Jon McBride, Milford, CT (US); Scott A. Chasen, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 332 days.

(21) Appl. No.: 15/308,512

(22) PCT Filed: May 1, 2015

(86) PCT No.: PCT/US2015/028839
§ 371 (c)(1),
(2) Date: Nov. 2, 2016

(87) PCT Pub. No.: WO2016/003534
PCT Pub. Date: Jan. 7, 2016

(65) Prior Publication Data
US 2017/0050739 A1 Feb. 23, 2017

Related U.S. Application Data (60) Provisional application No. 61/987,841, filed on May 2, 2014.

(51) Int. Cl.
*B64D 27/26* (2006.01)
*B64D 41/00* (2006.01)
*B64D 27/14* (2006.01)

(52) U.S. Cl.
CPC ............. *B64D 27/26* (2013.01); *B64D 27/14* (2013.01); *B64D 41/00* (2013.01); *B64D 2041/002* (2013.01)

(58) Field of Classification Search
CPC .............. B64D 27/26; B64D 2027/262; B64D 2027/266; B64D 2041/002
See application file for complete search history.

(56) References Cited

U.S. PATENT DOCUMENTS 2,633,312 A * 3/1953 Hagger ................. B64D 27/26
244/54
2,753,140 A * 7/1956 Hasbrouck ............ B64D 27/26
248/555

(Continued)

OTHER PUBLICATIONS

Notification of Transmital of the International Search Report for International Application No. PCT/US2015/028839 dated Jan. 18, 2016; dated Feb. 3, 2016; 13 pages.

(Continued)

*Primary Examiner* — Philip J Bonzell
*Assistant Examiner* — Tye William Abell
(74) *Attorney, Agent, or Firm* — Cantor Colburn LLP (57) ABSTRACT A method for securing an engine using an adjustable mounting assembly is provided including adjusting an extendible element of the adjustable mounted assembly from a first position to a second position. Another extendible element of the adjustable mounting assembly is adjusted from a third position to a fourth position. The engine is mounted using the adjustable mounted assembly with the extendible element in the second position and another extendible element in the fourth position.

7 Claims, 8 Drawing Sheets

(56) References Cited

U.S. PATENT DOCUMENTS

| | | | | |
|---|---|---|---|---|
| 3,085,773 A * | 4/1963 | Covey | ................... | B64D 27/26 |
| | | | | 248/555 |
| 3,135,487 A * | 6/1964 | Kottsieper | ................ | B64C 1/00 |
| | | | | 244/17.27 |
| 3,145,003 A | 8/1964 | Hart | | |
| 3,353,771 A * | 11/1967 | Bow | ...................... | B60K 5/125 |
| | | | | 180/292 |
| 3,809,340 A * | 5/1974 | Dolgy | ................... | B64D 27/20 |
| | | | | 244/54 |
| 3,907,220 A * | 9/1975 | Amelio | .................. | B64D 27/18 |
| | | | | 244/54 |
| 4,079,981 A * | 3/1978 | Mahler | ................. | B64D 27/26 |
| | | | | 244/54 |
| 4,500,054 A * | 2/1985 | Osborn | ..................... | F02C 7/20 |
| | | | | 180/69.6 |
| 5,275,357 A * | 1/1994 | Seelen | ................... | B64D 27/26 |
| | | | | 244/54 |
| 6,328,293 B1 * | 12/2001 | Olsen | ................... | B60K 5/1241 |
| | | | | 244/54 |
| 8,490,916 B2 | 7/2013 | Olsen et al. | | |
| 2007/0221431 A1 | 9/2007 | Hirsh | | |
| 2008/0237394 A1 | 10/2008 | Combes et al. | | |
| 2009/0084893 A1 | 4/2009 | Balk | | |
| 2009/0236167 A1 | 9/2009 | Hirsh et al. | | |
| 2010/0038471 A1 * | 2/2010 | Olsen | ..................... | B64D 41/00 |
| | | | | 244/54 |
| 2013/0302157 A1 | 11/2013 | Sandy et al. | | |
| 2016/0297539 A1 * | 10/2016 | Cazenave | ............. | B64D 41/00 |

OTHER PUBLICATIONS

Written Opinion of the International Searching Authority for International Application No. PCT/US2015/028839 dated Jan. 18, 2016; dated Feb. 3, 2016; 4 pages.

* cited by examiner

ARTICULATED MOUNTS

CROSS REFERENCE TO RELATED APPLICATIONS

This application is a National Stage application of PCT/US2015/028839, filed May 1, 2015, which claims the benefit of U.S. Provisional Application No. 61/987,841, filed May 2, 2014, both of which are incorporated by reference in their entirety herein.

BACKGROUND

On an aircraft, engines such as auxiliary power units (APUs) require substantial mounting systems to withstand crash loads. The mounting systems must also provide certain degrees of freedom to ensure that the mounts do not fight or restrict one another. To meet these requirements, conventional mount systems simply provide adjustment through the use of shims. The mount systems and engines are typically machined/manufactured to very tight tolerances, such that the use of the shims provides for very limited adjustment.

When designing an aircraft, such as a first build of an aircraft, many variables may either be unknown or values for the variables may be incorrect or improperly assumed. For example, flight load induced deflections experienced by different portions of the aircraft may have an impact on various aircraft interfaces. A lack of flexibility across or between the interfaces can lead to expensive redesign efforts and delay. Furthermore, if the aircraft design is associated with multiple variants, flexibility or an adjustment capability may be needed to satisfy all interface requirements across all the variants.

BRIEF SUMMARY

According to one embodiment of the invention, a method for securing an engine using an adjustable mounting assembly is provided including adjusting an extendible element of the adjustable mounted assembly from a first position to a second position. Another extendible element of the adjustable mounting assembly is adjusted from a third position to a fourth position. The engine is mounted using the adjustable mounted assembly with the extendible element in the second position and the another extendible element in the fourth position.

In addition to one or more of the features described above, or as an alternative, in further embodiments at least one of the extendible element and the another extendible element comprises a pivoting link connected to a tie-rod. The tie-rod is axially adjustable in order to change a position of the pivoting link.

In addition to one or more of the features described above, or as an alternative, in further embodiments the tie-rod is configured to selectively drive the link in an inboard or outboard direction.

In addition to one or more of the features described above, or as an alternative, in further embodiments at least one of the extendible element and the another extendible element includes a forward link which rotates about an axis to change a position of the link to accommodate a tolerance associated with the engine and to accommodate thermal growth associated with the engine.

According to another embodiment of the invention, a system for securing an engine to an aircraft is provided including a first mount assembly and a second mount assembly. The first mount assembly includes a first link having a link attachment and a tie-rod configured to move the link attachment to an attachment point of the engine. The second mount assembly includes a second link which moves to meet another attachment point of the engine.

In addition to one or more of the features described above, or as an alternative, in further embodiments the tie-rod is configured to selectively drive the link attachment in an inboard or outboard direction.

In addition to one or more of the features described above, or as an alternative, in further embodiments the second mount assembly includes a fixed aft or forward pivot lug connection which is connectable to the second mounting point.

In addition to one or more of the features described above, or as an alternative, in further embodiments the aircraft is a helicopter and the engine is an auxiliary power unit engine that is suspended from an upper deck of the helicopter.

In addition to one or more of the features described above, or as an alternative, in further embodiments the second mount assembly is configured to accommodate the load associate with the engine in at least a second direction.

In addition to one or more of the features described above, or as an alternative, in further embodiments the first and second directions are different directions.

Technical effects include a mounting assembly for mounting various engines to an airframe of a rotary wing aircraft.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described regarding the design and use of articulated mounts. The mounts may be used in connection with one or more engines of an aircraft, such as an auxiliary power unit (APU) engine. In some embodiments, an engine may hang or be suspended from an upper deck of the aircraft. In some embodiments, the mounts may include a side mount assembly and an upper mount assembly. The assemblies may be used to ensure that an engine is secured to the aircraft body or structure, even during a crash or other event that would otherwise have a tendency to dislodge or displace the engine. The assemblies may include one or more components or devices as described in further detail below.

Figure 1:
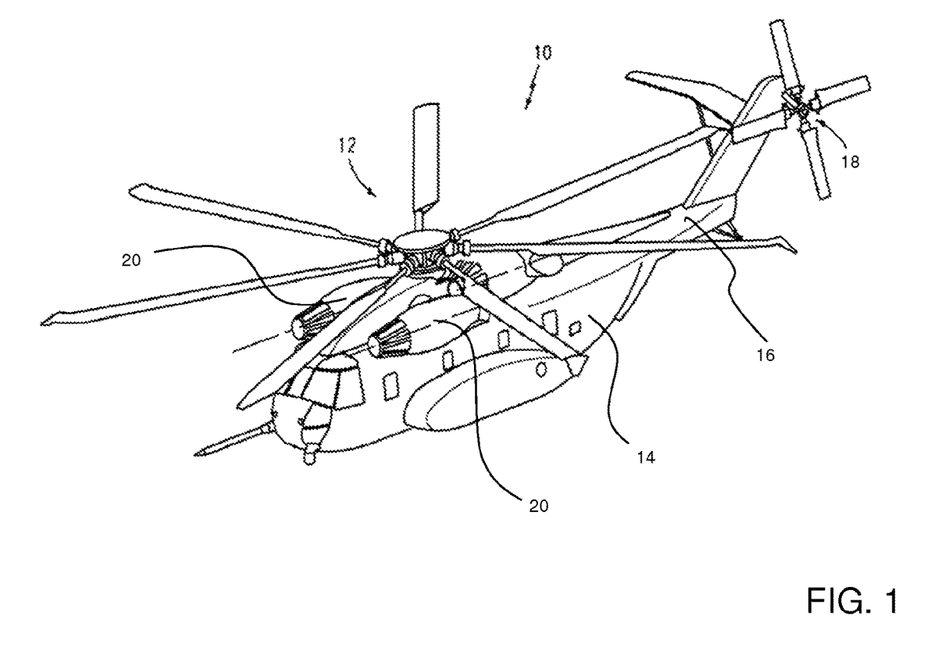
FIG. 1 is a general perspective side view of an example of a rotary wing aircraft.

Referring now to the FIGS., an example of a rotary wing aircraft 10 having a main rotor assembly 12 is schematically illustrated. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation A through a main gearbox by one or more engines 20. In one embodiment, each of the engines 20 may include one or more auxiliary power units (APUs) (not shown) configured to provide power to each of the engines 20. The APUs and/or the engines 20 may be mounted to the airframe 14 with a mount (FIGS. 2-3), such as a side mount assembly 200 and an upper mount assembly 300 for example.

Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention. For example, embodiments of the disclosure may be applied in connection with a helicopter including coaxial main rotors and a pusher propeller, such as Sikorsky's S-97 Raider or even a commercial fixed wing aircraft. Moreover, aspects of the invention can be used with an aircraft 10 having any number of engines 20 and/or APUs.

Figure 2:
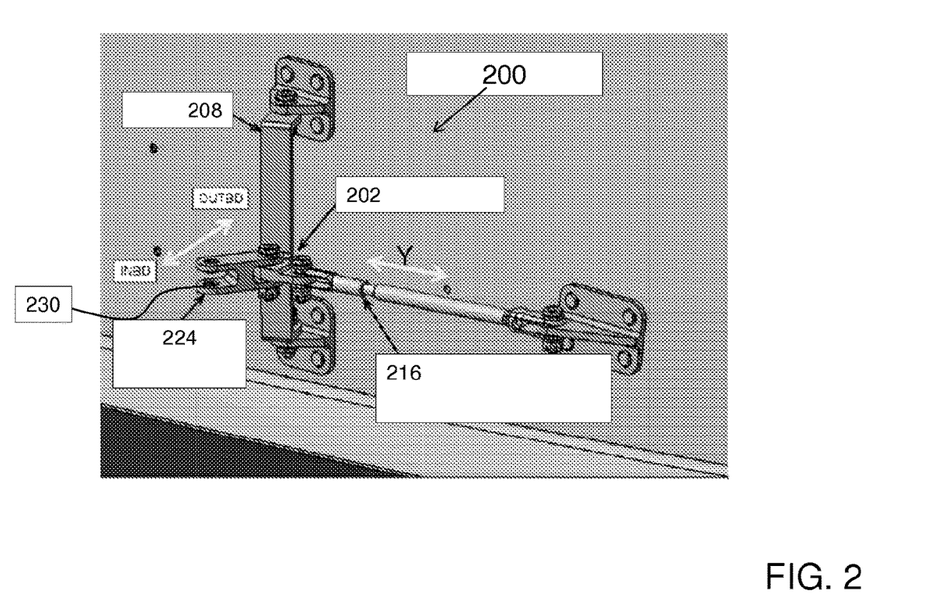
FIG. 2 is a diagram of an exemplary side mount assembly.

Referring to FIG. 2, the side mount assembly 200 in accordance with one or more embodiments is shown. The assembly 200 may employ an over-center geometry 202 in connection with a pivoting link/wishbone assembly 208. The assembly 200 may include an adjustable tie-rod or tie-rod arm 216 that drives a link attachment 224 connected to an adjacent engine 20. In one embodiment, a portion of the engine 20, such as a lug of an APU (not shown) for example, is configured to mount to the assembly at the through hole attachment point 230. By adjusting the length of the tie-rod 216, the tie-rod 216 selectively drives the link attachment 224 in either an inboard (INBD) or outboard (OUTBD) direction as shown in FIG. 2. In one embodiment, the tie-rod 216 includes a plurality of threads such that rotation in a first direction causes the tie-rod 216 to extend, and rotation in a second, opposite direction causes the tie-rod 216 to extract. By changing the length of the tie-rod 216, the tie-rod 216 may both move and lock the attachment 224 to anchor the movement of the adjacent component along the Y axis. Based on the components and devices associated with the side mount assembly 200, the side mount assembly 200 may effectively "grab" a portion of the engine 20 and react engine loads along the Y axis. As shown, the Y axis is substantially horizontal in the fore-aft direction, but it is understood that the Y axis can be in other directions depending on the orientation of the engine 20 and/or the geometry of the fuselage 14.

Figure 3:
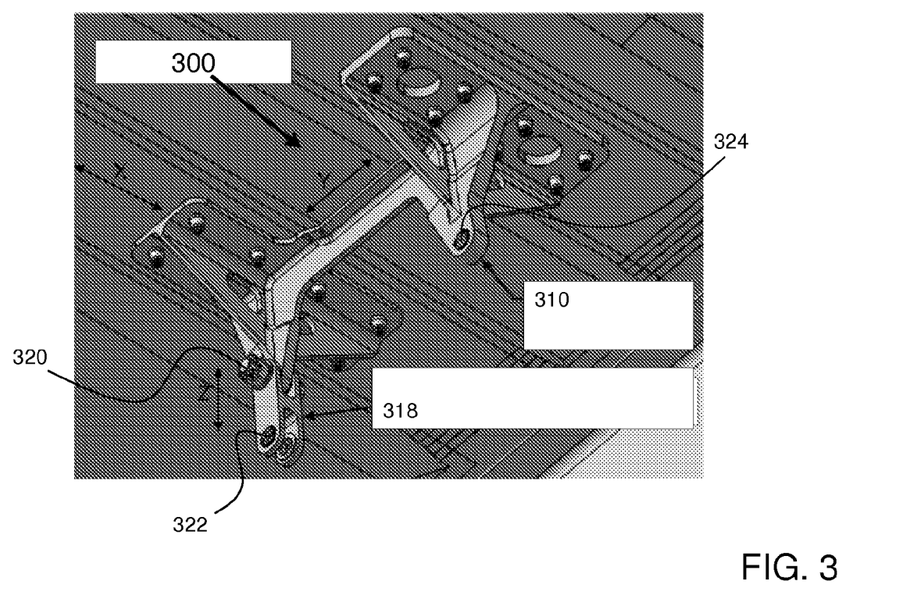
FIG. 3 is a diagram of an exemplary upper mount assembly.

Referring to FIG. 3, an upper mount assembly 300 in accordance with one or more embodiments is shown. The assembly 300 features both a fixed aft pivot lug connection 310 and an adjustable forward link 318 that allows for fitting/APU tolerances as well as APU thermal growth. As shown, the adjustable forward link 318 is rotatable about an axis so as to lower or raise the link 318 relative to the fuselage 14. Owing to the fixed location of attachment point 310 on assembly 300, and its ability to react loads in both the Y and Z axis, the pivoting link 318 then also provides capability to react load in the Z axis when the engine 20 is mounted to the assembly 300

324. The assembly 300 may accommodate, e.g., X and Z axis loads while accommodating mount/APU variability and thermal growth.

The X, Y, and Z axes referenced above in connection with the side mount assembly 200 and an upper mount assembly 300 are merely illustrative. While shown as orthogonal, it is understood that such X, Y, Z axes need not all be orthogonal to one another in other aspects. Different coordinate systems may be used or superimposed with respect to the operation and functionality of the assemblies 200 and 300. The orientation(s) or direction(s) of loads that is/are accommodated by a given assembly 200 and 300 may be based on one or more factors, such as one or more safety requirements, loading requirements, aircraft configuration parameters, etc.

Figure 4:
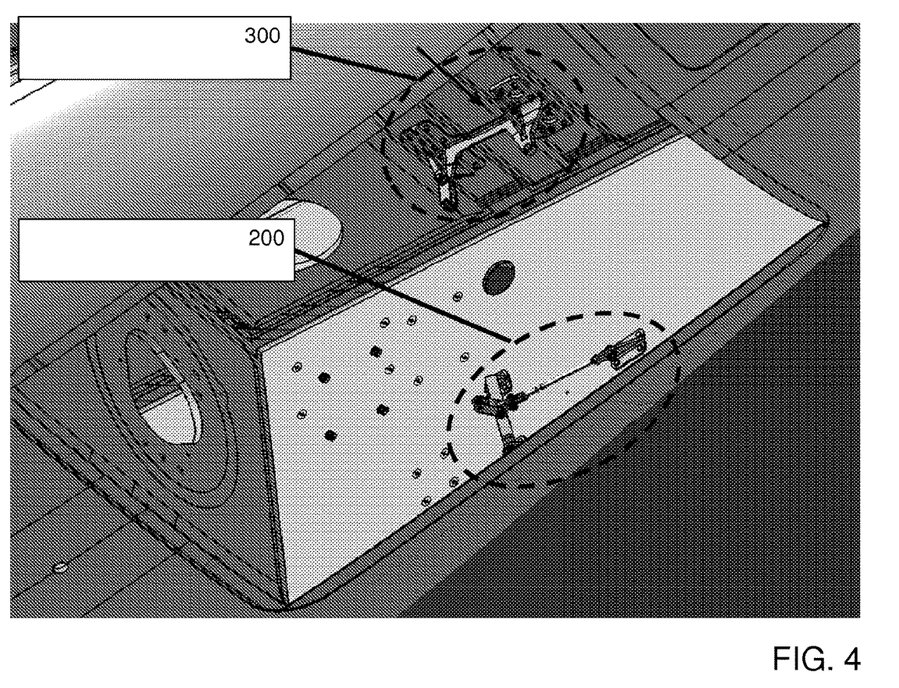
FIG. 4 illustrates an exemplary installation of a side mount assembly and an upper mount assembly.

Referring to FIGS. 2 through 4, an exemplary installation of the side mount assembly 200 and upper mount assembly 300 on the airframe 14 of an aircraft 10 is shown. In particular, the view provided in FIG. 4 may correspond to looking up through an access door opening of an auxiliary power unit (APU) bay. Through adjustment of the adjustable links 224 and 318, multiple sizes of engines 20 can be mounted in the same location using the common mount assemblies 200 and 300.

Figure 5:
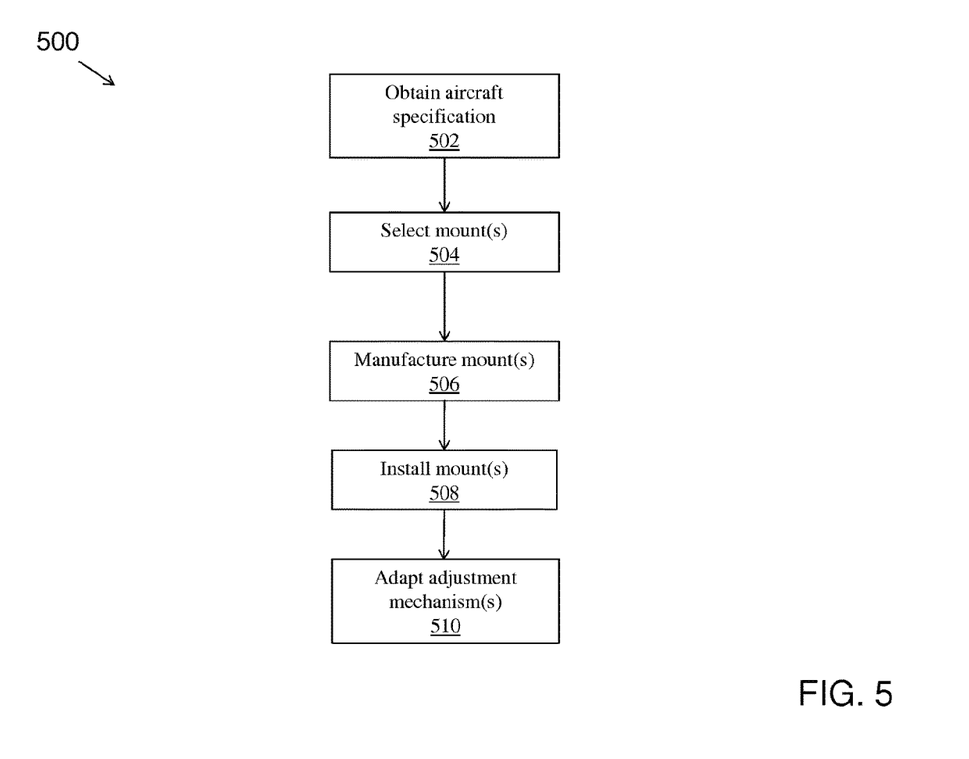
FIG. 5 illustrates a flow chart of an exemplary method.

Turning now to FIG. 5, a flow chart of an exemplary method 500 is shown. The method 500 may be executed in connection with one or more systems, components, or devices, such as those described herein. The method 500 may enable a skilled artisan to make and use one or more articulated mounts for securing an engine 20 to an aircraft 10.

In block 502, a specification for an aircraft may be obtained. The specification may include details regarding the type, size, location, or tolerances for one or more engines associated with the aircraft. The specification may include operating range requirements (e.g., a range of temperatures) that the aircraft or the engines are required to operate under. The specification may include requirements regarding the types or values for loads (e.g., crash loads) that may be associated with the aircraft or the engines. Other parameters or requirements may be included in the specification.

In block 504, one or more mounts (e.g., articulated mounts) or mounting assemblies may be selected, potentially based on the specification of block 502. Features, components, or devices associated with the mounts may be selected as part of block 504. For example, an adjustment range or capability associated with the tie-rod 216 or the forward link 318 described above may be selected as part of block 504.

In block 506, the mounts or mounting assemblies selected in block 504 may be manufactured or assembled.

In block 508, the manufactured mounts or mounting assemblies may be installed or deployed on an aircraft.

In block 510, one or more adjustment mechanisms (e.g., the tie-rod 216 or the forward link 318) may be adapted manually (e.g. by rotating the rod end of tie-rod 216) or automatically (e.g., allowing the forward link 318 to swing), as part of their use to accommodate one or more interfaces of the aircraft.

The method 500 is illustrative. In some embodiments, one or more of the blocks or operations (or a portion thereof)

may be optional. In some embodiments, one or more additional blocks or operations not shown may be included. In some embodiments, the blocks or operations may execute in an order or sequence that is different from what is shown in FIG. 5. Further, in some embodiments, not all operations are performed by the same entity, such as where one entity manufactures the mounts 200 and/or 300, and another entity adjusts the links 210 and/or 318.

Figure 6A:
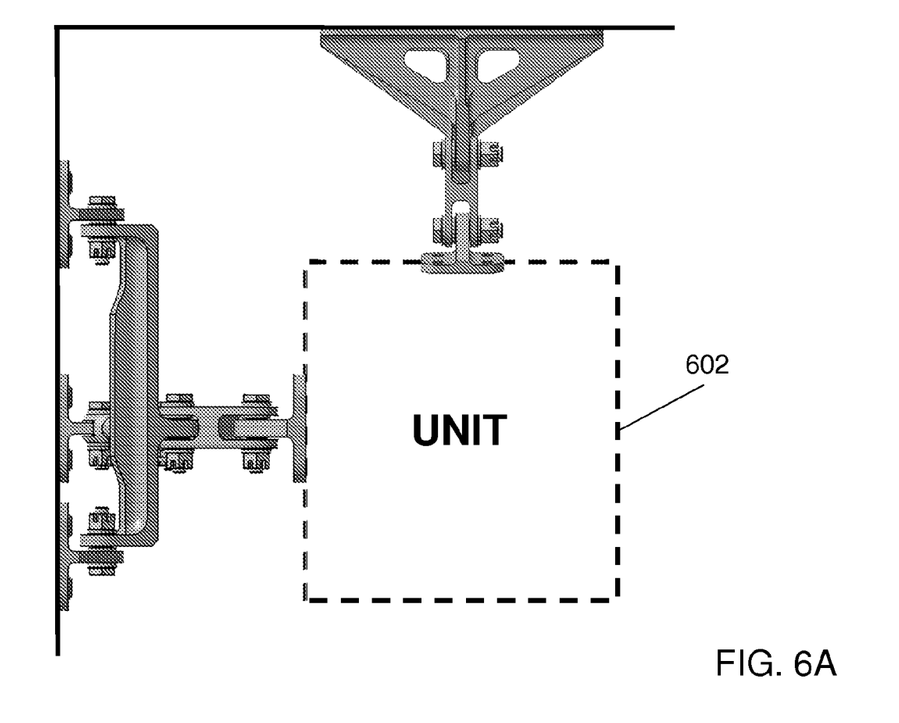
FIG. 6A illustrates a system providing support for a unit viewed from an end perspective in accordance with an embodiment.
Figure 6B:
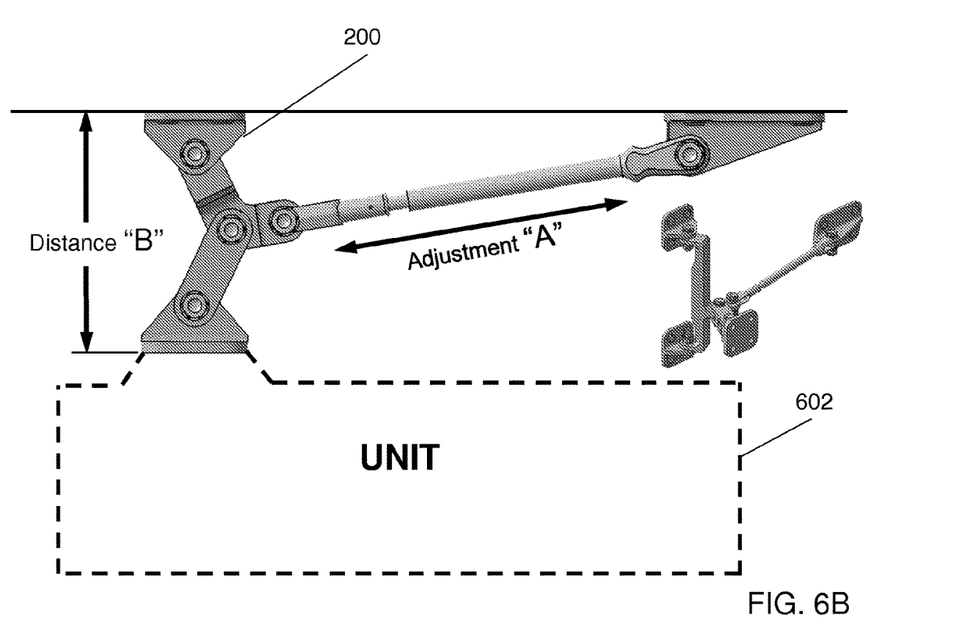
FIG. 6B illustrates a system providing support for a unit viewed from a top perspective using a y-axis adjustment in accordance with an embodiment.
Figure 6C:
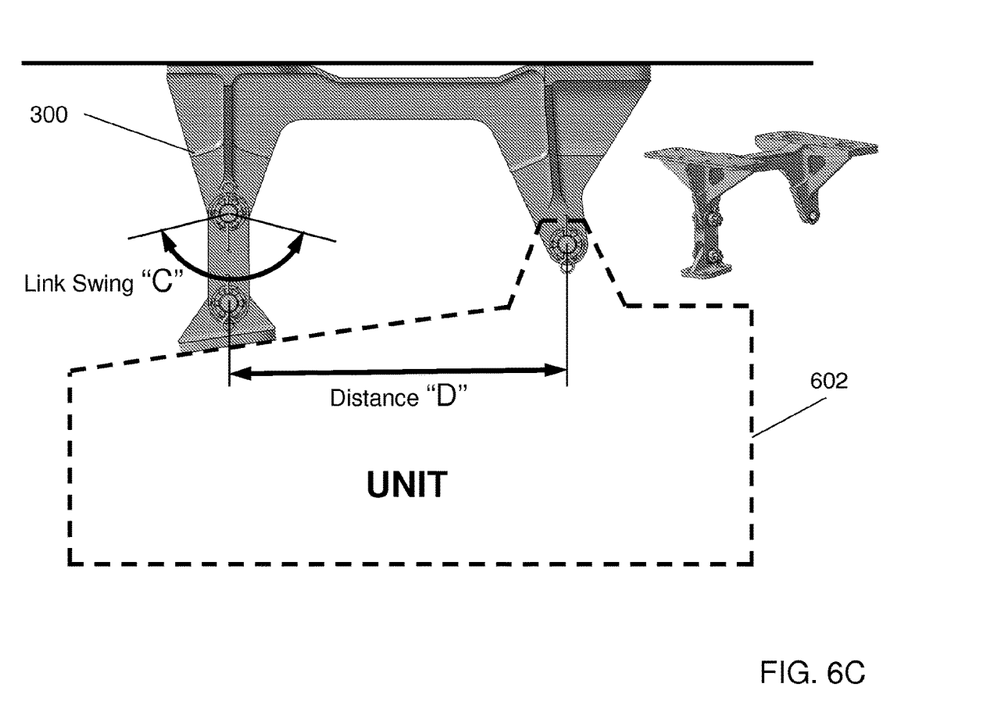
FIG. 6C illustrates a system providing support for a unit viewed from a side perspective with variable pitch/thermal expansion compensation in accordance with an embodiment.

Referring to FIGS. 6A-6C (referred to herein as FIG. 6), support for a unit 602 in accordance with one or more embodiments is shown. As shown in FIG. 6, adjustment in one or more dimensions (labeled with parameters 'adjustment A', 'distance B', 'link swing C' and 'distance D') may be provided.

Embodiments of the disclosure may be used to satisfy a manufacturer's installation mount requirements while providing a strong, light weight system architecture. Mounting systems in accordance with various embodiments of the disclosure may offer a generous amount of adjustment capability to accommodate hardware and airframe variability.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations. Further, while described in terms of a rotary wing aircraft, it is understood that the mounting assemblies could be used in other applications, such as for mounting engines in a fixed wing aircraft, mounting machinery in buildings, or other environments in which multi-axis restraints are required to mount an object which can have multiple sizes.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A system for securing an engine to an aircraft, comprising:
    a first mount assembly for coupling to the engine comprising a first link having a link attachment and a tie-rod configured to move the link attachment to an attachment point of the engine;
    a pivoting link attached to the first link, the tie rod, and the aircraft; and
    a second mount assembly for coupling to the engine comprising a second link which moves to meet another attachment point of the engine.

2. The system of claim 1, wherein the tie-rod is configured to selectively drive the link attachment in an inboard or outboard direction.

3. The system of claim 1, wherein the second mount assembly comprises a fixed aft or forward pivot lug connection which is connectable to the second mounting point.

4. The system of claim 1, wherein the aircraft is a helicopter, and wherein the engine is an auxiliary power unit engine that is suspended from an upper deck of the helicopter.

5. The system of claim 1, wherein the first mount assembly is configured to accommodate a load associated with the engine in at least a first direction.

6. The system of claim 5, wherein the second mount assembly is configured to accommodate the load associated with the engine in at least a second direction.

7. The system of claim 6, wherein the first and second directions are different directions.

* * * * *